United States Patent
Fukami

(10) Patent No.: US 7,989,642 B2
(45) Date of Patent: Aug. 2, 2011

(54) PROCESS FOR PRODUCING POWDERED COMPOSITIONS CONTAINING HIGHLY UNSATURATED FATTY ACID ESTERS OF ASCORBIC ACID AND POWDERED COMPOSITIONS CONTAINING THE ESTERS

(75) Inventor: Harukazu Fukami, Kyoto (JP)

(73) Assignee: Suntory Holdings Limited, Osaka (JP)

( * ) Notice: Subject to any disclaimer, the term of this patent is extended or adjusted under 35 U.S.C. 154(b) by 1026 days.

(21) Appl. No.: 10/547,259

(22) PCT Filed: Feb. 27, 2004

(86) PCT No.: PCT/JP2004/002404
§ 371 (c)(1),
(2), (4) Date: Dec. 28, 2005

(87) PCT Pub. No.: WO2004/076603
PCT Pub. Date: Sep. 10, 2004

(65) Prior Publication Data
US 2006/0160891 A1    Jul. 20, 2006

(30) Foreign Application Priority Data
Feb. 28, 2003 (JP) .................................. 2003-052701

(51) Int. Cl.
*C07D 307/62* (2006.01)
*C08K 2/16* (2006.01)

(52) U.S. Cl. ....................................... 549/317; 524/459
(58) Field of Classification Search .................. 549/317; 529/459
See application file for complete search history.

(56) References Cited

U.S. PATENT DOCUMENTS
6,069,168 A    5/2000  Horrobin et al.
7,258,873 B2 *  8/2007  Truong-Le et al. ........... 424/489

FOREIGN PATENT DOCUMENTS
| JP | 06-122627 | 5/1994 |
| JP | 06-228589 | 8/1994 |
| JP | 07-313057 | 12/1995 |
| JP | 09-235584 | 9/1997 |
| JP | 10-099046 | 4/1998 |
| JP | 10-139664 | 5/1998 |
| WO | WO 94/20092 A1 | 9/1994 |

OTHER PUBLICATIONS

Sato, Kiyotaka, ed. "Development of Functional Lipids," 1992, pp. 13-34 with translation.
Akihiro, Watanabe et al., "Hepatic Diseases and Therapeutic Nutrition," Dai-ichi Shuppan, 1992, pp. 153-171 with translation.
Cameron, N.E. et al.; "Comparison of the effects of ascorbyl y-linolenic acid and y-linolenic acid in the correction of neurovascular deficits in diabetic rats," Diabetologia, 1996, pp. 1047-1054, vol. 39.
Okuyama, Hiromi. ed. "Brain Functions and Lipids," 1997, Gakkai Center Kansai, pp. 7-25 with translation.
"Fragrance Journal," Mar. 1997, vol. 25 Special Edition, English language abstracts on pp. 7, 20, 29, 34, 41, and 55.
Watanabe, Yoshiyuki et al., "Lipase-catalyzed synthesis of 6-0-eicosapentaenoyl L-ascorbate in acetone and its autoxidation," Biotechnology Letters, 2000, pp. 637-640, vol. 22.
Watanabe, Yoshiyuki et al., "Lipase-Catalyzed Synthesis of Unsaturated Acyl L-Ascorbates and Their Ability to Supress the Autoxidation of Polyunsaturated Fatty Acids," J. Am. Oil Chem. Soc., Aug. 2001, pp. 823-826, vol. 78.
Adachi, Shuji et al., Encapsulated Lipid and Its Application to Functional Foods, J. Soc. Powder Technol., 2002, pp. 122-129, vol. 39.
Watanabe, Yoshiyuki et al.,"Supressive Effect of Saturated Acyl 1-Ascorbate on the Oxidation of Linoleic Acid Encapsulated with Maltodextrin or Gum Arabic by Spray-Drying," Journal of Agricultural and Food Chemistry, 2002, pp. 3984-3987, vol. 50.
Minemoto, Y. et al., "Oxidation of linoleic acid encapsulated with gum arabic or maltodextrin by spray-drying," J. Microencapsulation, 2002, pp. 181-189, vol. 19, No. 2.
Watanabe, Yoshiyuki et al., Powderization of Polyunsaturated Fatty Acids ester ascorbate, 2003, p. 70.

* cited by examiner

*Primary Examiner* — Janet L. Andres
*Assistant Examiner* — Raymond Covington
(74) *Attorney, Agent, or Firm* — Ostrager Chong Flaherty & Broitman P.C.

(57) ABSTRACT

The invention provides a process for powdering highly unsaturated fatty acid esters of ascorbic acid which are pasty and problematic in physical properties by a simple and easy means; highly unsaturated fatty acid esters of ascorbic acid which are improved in stability by powdering; and compositions containing the powdered highly unsaturated fatty acid esters of ascorbic acid. Specifically, a process for powdering a highly unsaturated fatty acid ester of ascorbic acid as represented by the general formula (I): RCO-A [wherein RCO— is acyl derived from a highly unsaturated fatty acid; and A is an ascorbic acid residue bonded through an —O— linkage resulting from an hydroxyl group of ascorbic acid], characterized by mixing a highly unsaturated fatty acid ester of ascorbic acid as represented by the general formula (I) with an aqueous solution of a water-soluble filler to form an emulsion and dehydrating and drying the emulsion by a spray drying method.

12 Claims, 1 Drawing Sheet

PROCESS FOR PRODUCING POWDERED COMPOSITIONS CONTAINING HIGHLY UNSATURATED FATTY ACID ESTERS OF ASCORBIC ACID AND POWDERED COMPOSITIONS CONTAINING THE ESTERS

The present application is an English language translation of International Application PCT No. PCT/JP2004/002404, filed Feb. 27, 2004, which claims priority to Japanese Application No. JP 2003-052701, filed Feb. 28, 2003; both applications are hereby incorporated by reference.

TECHNICAL FIELD

The present invention relates to ascorbic acid esters of polyunsaturated fatty acids shown by the following general formula (I):

$$RCO-A \quad (I)$$

(wherein RCO— is an acyl group originating from a polyunsaturated fatty acid; and A is an ascorbic acid residue that is linked via "—O—" originating from the hydroxyl group of ascorbic acid). The esters of the present invention serve both as pro-forms of polyunsaturated fatty acids that have an increased stability against oxidation and are converted into polyunsaturated fatty acids once in a body, and as pro-forms of vitamin C, or pro-vitamin C. More specifically, the present invention relates to a process for forming the ascorbic acid ester of polyunsaturated fatty acid into a powder composition that facilitates handling of the compound during its production or use, as well as to a composition containing the powdered esters.

Even more specifically, the present invention relates to a process for forming the ascorbic acid ester of polyunsaturated fatty acid shown by the general formula (I) (which may be referred to as "polyunsaturated fatty acid/ascorbic acid ester," hereinafter) into a powder composition by mixing the compound with an aqueous solution of a water-soluble polysaccharide, a type of excipient, to form an emulsion, and dehydrating/drying the emulsion by spray-drying. The present invention further relates to a composition containing the powdered polyunsaturated fatty acid/ascorbic acid ester produced by the above process.

BACKGROUND ART

1. Polyunsaturated Fatty Acid

Polyunsaturated fatty acids (PUFAs) generally refer to fatty acids that consist of 18 to 22 carbon atoms and have a degree of unsaturation of 2 to 6. Specifically, PUFAs range from linoleic acid (18 carbon atoms, degree of unsaturation=2) to docosahexaenoic acid (DHA) (22 carbon atoms, degree of unsaturation=6).

Of different polyunsaturated fatty acids, docosahexaenoic acid (DHA), eicosapentaenoic acid (EPA), α- or γ-linolenic acid, dihomo-γ-lenolenic acid (DGLA), and arachidonic acid are not only known to play important roles as biological compounds, but also have various useful functions (See, for example, Okuyama Hiromi. ed., "Brain Functions and Lipids" (1997) Gakkai Center Kansai; Sato Kiyotaka. ed., "Development of Functional Lipids" (1992); Watanabe Akihiro et al., "Hepatic Diseases and Therapeutic Nutrition" (1992) Dai-ichi Shuppan.). Some are already in use as pharmaceutical agents, food and nutritional products. In general, these polyunsaturated fatty acids occur in the form of glycerides or phospholipids rather than in the form of free acids, and are used as oils containing polyunsaturated fatty acids.

2. Vitamin C

Vitamin C exhibits various physiological activities: it facilitates synthesis of collagen, the depletion of which causes scurvy; it acts as a biological antioxidant and eliminates free radicals generated in a body; and it is involved in the oxidation/reduction of iron ions of cytochrome C. Other important activities of vitamin C include anticancer activity, stimulation of immune functions and suppression of cholesterol synthesis and associating anti-arteriosclerosis activity. The antioxidation activity and the ability to facilitate collagen synthesis, along with the associating anti-photoaging, anti-UV damage and anti-pigmentation activities, make vitamin C a dermatologically important compound suitable for use in cosmetics (See, for example, "Fragrance Journal," vol. 25, March (1997) Special edition.). Vitamin C is also added in food and cosmetic products as antioxidant.

3. Polyunsaturated Fatty Acids and Pro-Forms of Vitamin C

Despite their wide range of applications, polyunsaturated fatty acids and vitamin C are susceptible to oxidation. For this reason, much effort has been devoted to developing pro-forms of vitamin C (pro-vitamin C), vitamin C derivatives that are converted to vitamin C once inside a body. Among pro-vitamins C thus far produced are 6-O-palmitoyl- and 6-O-stearyl-ascorbic acid esters, which are antioxidants with high solubility in lipid, 2-O-α-glucopyranosyl ascorbic acid having increased stability against oxidation, and those with phosphoric acid or sulfuric acid bound to position 2. Attempts have also been made to make pro-forms by combining a polyunsaturated fatty acid with vitamin C. Of such pro-forms, the ascorbic acid derivatives in which an acyl group originating from a polyunsaturated fatty acid is bound to position 6 via an ester linkage are known to have higher stability against oxidation than the original polyunsaturated fatty acid and are, thus, useful (See, for example, J. Am. Oil Chem. Soc., 78(2001): 823).

Aside from the functions anticipated from the polyunsaturated fatty acid and ascorbic acid, these pro-forms of polyunsaturated fatty acid and vitamin C may exhibit completely new properties. For example, of the ascorbic acid derivatives in which an acyl group originating from a polyunsaturated fatty acid is bound to position 6 via an ester linkage, 6-O-docosahexaenoyl-ascorbate is known to have anti-arrhythmia activity (Japanese Patent Laid-Open Publication No. Hei 10-139664), calcium antagonist activity (International Patent Publication No. WO 94/20092), and anti-allergy activity (Japanese Patent Laid-Open Publication No. Hei 6-122627). Also, 6-O-γ-linoleyl-ascorbate has proven to have an ability to inhibit aldose reductase (U.S. Pat. No. 6,069,168) and is shown to be effective against streptozotocin-induced diabetes model (Diabetologia. 39(1996): 1047).

4. Techniques to Make Polyunsaturated Fatty Acid Into Powder

Oils containing polyunsaturated fatty acids are generally provided in the form of liquid oil or semi-solid (paste). These oils are susceptible to oxidation and are therefore difficult to handle. In one technique to cope with this problem, linoleic acid is mixed with a water-soluble polysaccharide, such as maltodextrin, gum Arabic and soybean polysaccharide, in the presence of various surfactants, and the mixture is spray-dried to form microcapsules (powderization). The resulting linoleic acid powder has higher stability against oxidation than the original linoleic acid (See, for example, *J. Agr. Food Chem.*, 50(2002): 3984, *J. Microencapsulation*, 19(2002): 181).

Other techniques for forming polyunsaturated fatty acids into a powder composition have been described in several patent applications. For example, Japanese Patent Laid-Open Publication No. Hei 6-228589 describes a technique for providing a powder that can be preserved stably over a prolonged storage period without forming peroxides, can be readily dispersed in water, and is easy-handling. In this technique, a water-soluble excipient comprising a protein or a polysaccharide or an alkaline metal salt thereof is used to form an O/W type emulsion, which is spray-dried. The water-soluble excipient on the surface of the resultant oil powder is modified with an acid or a metal with a valency of 2 into a water-insoluble form, which in turn is dispersed in a solution of water-soluble excipient. The solution is then spray-dried to form a water-soluble film on the surface of the oil powder.

A technique described in Japanese Patent Laid-Open Publication No. Hei 7-313057 uses defatted soybean to serve as an excipient and is particularly effective in improving the stability of polyunsaturated fatty acids against oxidation. Japanese Patent Laid-Open Publication No. Hei 10-99056 describes a technique for providing EPA or DHA-containing powder compositions. According to this technique, an oil-in-water-type emulsion is prepared by using DHA, an oil containing 10 wt % or more of DHA and/or 5 wt % or more of linoleic acid, 2 to 20 wt % of diet fiber as an excipient, 10 to 70 wt % of hydrolysis product of starch or lower sugar product obtained by reductive degradation of starch, and 0.01 to 5 wt % of antioxidant. The resulting emulsion is dried under vacuum.

Japanese Patent Laid-Open Publication No. Hei 9-235584 describes an oil composition obtained by adding 0.0001 to 1 parts by weight of ascorbic acid, along with 0.0001 to 1 parts by weight of at least one selected from citric acid, citrate, malic acid, and malate, to 100 parts by weight of an oil. The resulting oil is emulsified to obtain a W/O type emulsion, which in turn is dissolved in an aqueous phase to form a water-in-oil-type emulsion. This emulsion is then dried to form a powder.

The techniques described above are some of the known techniques for making polyunsaturated fatty acid-containing oils into powder. Each of these techniques, however, concerns a polyunsaturated fatty acid-containing oil, which has different physical properties from the ascorbic acid/polyunsaturated fatty acid ester of the present invention. Therefore, each of the above descriptions offers only limited teaching. The above-described techniques each have a different purpose for making a powder composition: each involves addition of extra additives or other troublesome complicated processes and thus cannot be directly applied to making the ascorbic acid/polyunsaturated fatty acid ester into powder.

Specifically, ascorbic acid esters of polyunsaturated fatty acid of the present invention having 3 or higher degree of unsaturation, including DHA, arachidonic acid and DGLA, do not readily crystallize. Rather, they tend to form a paste, making their handling difficult. Such characteristics of the esters also make them unsuitable for use in pharmaceutical or food products. Although preparations and compositions using these compounds have been described in literatures, such as oral preparations using 6-O-docosahexaenoyl-ascorbate described in Japanese Patent Laid-Open Publication No. Hei 10-139664 and International Patent Publication No. WO 94/20092, in which common excipients for use in oral preparations (e.g., starch, lactose and crystalline cellulose) are mentioned, no specific production process has been described that overcomes the problems caused by the physical properties of the compound. Nor can any specific description be found in U.S. Pat. No. 6,069,168, which describes 6-O-γ-linoleyl-ascorbate, regarding excipients for making tablets containing the compound. Thus, no techniques have thus far been available in this particular technical field for forming a powder composition of polyunsaturated fatty acid/ascorbic acid ester.

Accordingly, it is an objective of the present invention to provide a simple process for making a powder composition comprising a polyunsaturated fatty acid/ascorbic acid ester, which otherwise forms a paste and exhibits undesirable physical properties. It is another objective of the present invention to provide such a powder composition comprising a polyunsaturated fatty acid/ascorbic acid ester.

DISCLOSURE OF THE INVENTION

Addressing the above-described problems, the present invention comprises the followings:

(1) A process for making an ascorbic acid ester of a polyunsaturated fatty acid into powder, the ester represented by the following general formula (I):

$$RCO-A \qquad (I)$$

(wherein RCO— is an acyl group originating from a polyunsaturated fatty acid; and A is an ascorbic acid residue that is linked via "—O—" originating from the hydroxyl group of ascorbic acid), the process comprising:

mixing the ascorbic acid ester of polyunsaturated fatty acid with an aqueous solution of a water-soluble excipient to form an emulsion; and spray-drying the emulsion to dehydrate and dry the emulsion.

(2) The process according to (1) above, wherein the ascorbic acid ester of polyunsaturated fatty acid of the general formula (I) is first mixed with a diluent, and the mixture is then mixed with the aqueous solution of the water-soluble excipient.

(3) The process according to (2) above, wherein the mixing ratio by weight of the compound of the general formula (I) to the diluent is in the range of 1:1 to 1:100.

(4) The process according to (3) above, wherein the mixing ratio by weight of the compound of the general formula (I) to the diluent is in the range of 1:3 to 1:10.

(5) The process according to any one of (1) to (4) above, wherein the mixing ratio by weight of the compound of the general formula (I) or the mixture of the compound of the general formula (I) and the diluent to the aqueous solution of the excipient is in the range of 1:1 to 1:100.

(6) The process according to (5) above, wherein the mixing ratio by weight of the compound of the general formula (I) or the mixture of the compound of the general formula (I) and the diluent to the aqueous solution of the excipient is in the range of 1:2 to 1:20.

(7) The process according to any one of (1) to (6) above, wherein the water-soluble excipient is a water-soluble polysaccharide.

(8) The process according to (7) above, wherein the water-soluble polysaccharide is selected from maltodextrin, gum Arabic, soluble starch, and soybean polysaccharide.

(9) The process according to anyone of (2) to (6) above, wherein the diluent is a long-chain fatty acid or an ester thereof, a surfactant, or a liquid oil.

(10) The process according to (9) above, wherein the diluent is selected from methyl oleate, oleic acid, linoleic acid, olive oil, soybean lecithin, a monoglyceride of a fatty acid and a sugar ester of a fatty acid.

(11) The process according to any one of (1) to (10) above, wherein A in the compound of the general formula (I) is a residue originating from the 6 hydroxyl group of ascorbic acid.

(12) The process according to any one of (1) to (11) above, wherein RCO— in the compound of the general formula (I) is selected from acyl groups of arachidonic acid, dihomo-γ-linolenic acid, and docosahexaenoic acid.

(13) A composition containing the powdered compound represented by the general formula (I) and produced by the process according to any one of (1) to (12) above.

BEST MODE FOR CARRYING OUT THE INVENTION

Figure 1:
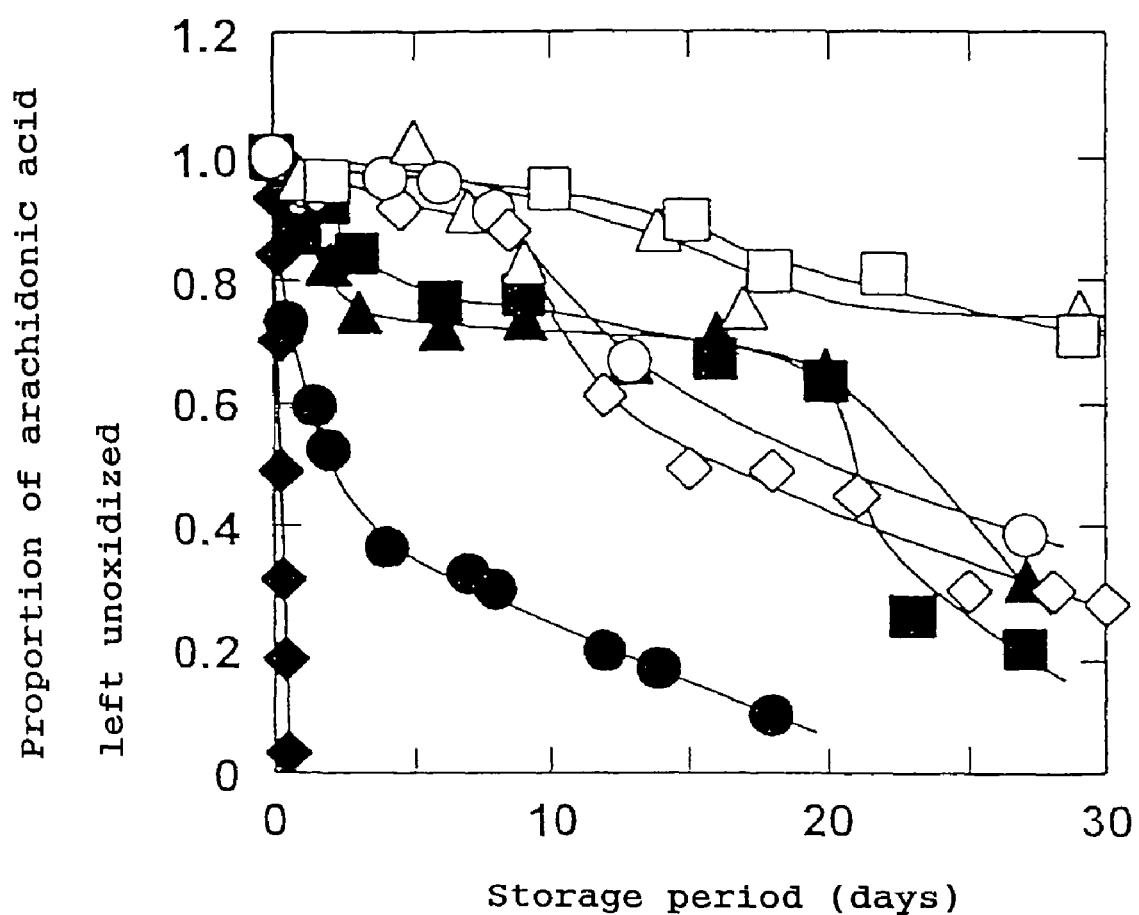
FIG. 1 is a graph showing the results of Example 4.
The symbols shown in the graph are as follows:
a blank square indicates the result for a gum Arabic-based powder (microcapsule) of 6-O-arachidonoyl-ascorbate obtained in Example 1;
a solid square indicates the result for a gum Arabic-based powder of arachidonic acid provided as a control;
a blank triangle indicates the result for a soybean polysaccharide (Soyafibe®)-based powder of 6-O-arachidonoyl-ascorbate obtained in Example 2;
a solid triangle indicates the result for a soybean polysaccharide (Soyafibe®)-based powder of arachidonic acid provided as a control;
a blank circle indicates the result for maltodextrin (Pinedex #100)-based 6-O-arachidonoyl-ascorbate obtained in Example 3;
a solid circle indicates the result for a (Pinedex #100)-based powder of arachidonic acid provided as a control;
a blank diamond indicates the result for non-powdered 6-O-arachidonoyl-ascorbate; and
a solid diamond indicates the result for non-powdered arachidonic acid.

As described above, the present invention specifically provides a process that involves mixing the polyunsaturated fatty acid/ascorbic acid ester of the general formula (I) with an aqueous solution of a water-soluble polysaccharide, a type of excipient, to form an emulsion, and then drying the emulsion by spray-drying. The resulting powdered (microcapsulated) polyunsaturated fatty acid/ascorbic acid ester not only becomes highly handleable, but also shows significantly improved stability against oxidation.

The powdered polyunsaturated fatty acid/ascorbic acid esters provided in accordance with the present invention may be suitably mixed with other components to make tablets, soft or hard capsules, and other preparations and are expected to find practical applications in the fields of pharmaceutical products, food products, and cosmetics.

As described above, the present invention provides an effective process for making the polyunsaturated fatty acid/ascorbic acid ester of the general formula (I) into powder. The compound of the general formula (I) has the desirable physiological activities of vitamin C and, at the same time, exhibits the physiological activities of polyunsaturated fatty acids, such as DHA, EPA, and arachidonic acid, each an important biological compound. In other words, the compound of the general formula (I) can be considered as a "dual pro-form" that serves both as a pro-form of a polyunsaturated fatty acid that has high stability against oxidation and as a pro-vitamin C. Thus, there has been a high expectation for the compounds of the general formula (I) to find a wide range of applications in food products, cosmetics, pharmaceutical products, and various other fields. Nonetheless, the compounds of the general formula (I) tend to form a paste, the characteristic that makes the compounds difficult to handle.

In the course of his study, the present inventor has found that the compound of the general formula (I) can be formed into powder in a simple fashion by selecting a particular water-soluble polysaccharide serving as an excipient, mixing it with an aqueous solution of the water-soluble polysaccharide to form an emulsion, and spray-drying the emulsion. Surprisingly, it has turned out that the polyunsaturated fatty acid is significantly more stable against oxidation in the resulting powdered material than in the original paste form of the polyunsaturated fatty acid/ascorbic acid ester. It was these findings that ultimately led to the present invention.

The present invention will now be described with reference to specific embodiments, which are not intended to limit the scope of the invention in any way.

The ascorbic acid derivatives represented by the general formula (I) in which an acyl group originating from a polyunsaturated fatty acid is bound to position 6 via an ester linkage can be chemically synthesized either by condensation of a polyunsaturated fatty acid with ascorbic acid using a common dehydrating agent such as dicyclohexylisourecarbodiimide or by treating an acid chloride of a polyunsaturated fatty acid with ascorbic acid (See, for example, U.S. Pat. No. 6,069,168). Alternatively, the ascorbic acid derivatives can be enzymatically synthesized by treating a polyunsaturated fatty acid and ascorbic acid with lipase in an organic solvent such as acetone (See, for example, *J. Am. Oil. Chem. Soc.* 78 (2001): 823). If necessary, the resulting compounds may be purified by silica gel chromatography.

In making the resulting polyunsaturated fatty acid/ascorbic ester compound of the general formula (I) into powder, the compound is preferably mixed with a diluent, such as a long-chain fatty acid or an ester thereof including methyl oleate, or an oil such as olive oil, prior to mixing with the aqueous solution of the water-soluble polysaccharide to serve as an excipient. The polyunsaturated fatty acid/ascorbic ester compound may be directly mixed with the excipient without using the diluent depending on the property of the compound.

The mixing ratio (by weight) of the ascorbic acid derivative, or polyunsaturated fatty acid/ascorbic acid ester compound, to the diluent is in the range of 1:1 to 1:100, and preferably in the range of 1:3 to 1:10. Instead of a fatty acid ester or an oil, a surfactant, which can form micelles, may be used as the diluent. Such a surfactant may be glyceryl monostearate, a monoglyceride of a fatty acid for use in food products, or a sugar ester (fatty acid ester of sucrose) or soybean lecithin, and may be used at the same ratio.

The resulting mixture is then mixed with the excipient to form an emulsion. The excipient used is a water-soluble polysaccharide dissolved in water in advance. Examples of such a water-soluble polysaccharide include, but are not limited to, dextrin, in particular maltodextrin, soluble starch, gum Arabic, or polysaccharides derived from soybean, such as "soyafibe" manufactured and marketed by Fuji Oil, Co., Ltd. The mixing ratio (by weight) of the oil mixture, that is, the polyunsaturated fatty acid/ascorbic acid ester compound or the mixture of the polyunsaturated fatty acid/ascorbic acid ester compound with the diluent, to the excipient is in the range of 1:2 to 1:100, and preferably in the range of 1:2 to 1:20. Using a homogenizer, the resulting mixture is then vigorously stirred to form an emulsion (O/W type emulsion with the dispersed phase being oil droplets).

If the amount of the oil is larger than 1:1 in terms of the mixing ratio (by weight) of the polyunsaturated fatty acid/ascorbic acid ester compound or the mixture of the polyunsaturated fatty acid/ascorbic acid ester compound with the diluent, to the excipient, the mixture may not be successfully formed into powder. Preferably, the size of the oil droplets in the emulsion is in the range of 0.1 to 5 µm. While the oil droplets may be smaller than this range, the droplets equal to, or greater than, 5 µm in size tend to destabilize the emulsion and are thus not suitable. More preferably, the size of the oil droplets is in the range of 0.01 to 1 µm since the oil droplets with a smaller size can lead to formation of favorable powder less susceptible to oxidation.

The resulting emulsion is then dried with a spray drier (100 to 200° C.) to give powder of the microcapsulated polyunsaturated fatty acid/ascorbic acid ester. While the drying process may be carried out using any technique, the spray drying using a spray drier can make the emulsion into powder in a simpler manner as compared to other drying measures, such as drum drying, vacuum freeze drying, and vacuum drying (drum-type and continuous belt-type), and is thus most preferred.

The resulting microcapsulated powder of 6-O-arachidonoyl-ascorbate was left in the air at 37° C. and a humidity of 12% for 30 days to determine the stability of the powder against oxidation (See, Example 4 below). During the 30-day period, samples were taken at predetermined intervals and were hydrolyzed into methyl arachidonate, which in turn was subjected to gas chromatography to determine the amount of non-oxidized arachidonic acid. The results are shown in Table 1. As shown, the stability of any polysaccharides used was improved by powdering. The increase in the stability against oxidation was particularly significant in gum Arabic and soybean polysaccharide.

As set forth, the present invention provides a powdering process to improve the physical properties of polyunsaturated fatty acid/ascorbic acid esters that show various physiological activities. The polyunsaturated fatty acid/ascorbic acid esters powdered by the process of the present invention proved to be significantly more stable against oxidation as compared to the non-powdered counterparts, which were highly susceptible to oxidation. Thus, the present invention facilitates the use of the polyunsaturated fatty acid/ascorbic acid esters of the general formula (I) in pharmaceutical products, food products, nutritional products, and cosmetic products.

EXAMPLES

The present invention will now be described in further detail with reference to Examples, which are provided by way of example only and are not intended to limit the scope of the invention in any way. As a reference, a production process is also presented of an ascorbic acid derivative having an acyl group originating from different polyunsaturated fatty acids bound to the position 6 via an ester linkage.

Reference Example 1

Synthesis of 6-O-arachidonoyl-ascorbate

Arachidonic acid (2.0 g, 6.6 mmol) was dissolved in benzene (20 ml). To this solution, oxalyl chloride (5.4 ml, 7.9 mmol) was added and the mixture was stirred at room temperature in a nitrogen atmosphere for 2.5 hours. Subsequently, the mixture was concentrated under reduced pressure to obtain arachidonyl chloride as an oily product. Meanwhile, L-ascorbic acid (1.4 g, 7.9 mmol) was added to a mixture of N-methylpyrrolidone (15 ml) and 4N-HCl/dioxane (2.4 ml) and the mixture was chilled on ice. To this solution, the arachidonyl chloride in methylene chloride (approx. 2 ml) was added, and the mixture was stirred overnight while chilled on ice. Upon completion of the reaction, water was added and the mixture was extracted with ethyl acetate. The ethyl acetate layer was washed with water (twice), was dried over anhydrous magnesium sulfate, and was concentrated under reduced pressure. The resulting residue was purified by silica gel chromatography (eluant=methanol/methylene chloride (1% to 20% methanol gradient)) and was dried under reduced pressure to give the desired product as a paste (2.7 g, 90% yield).

PMR (d ppm, CDCl$_3$); 0.87 (3H, t), 1.2-1.4 (6H, m), 1.73 (2H, q), 2.0-2.2 (4H, m), 2.36 (2H, t), 2.8-2.9 (6H, 4.2-4.3 (3H, m), 4.79 (1H, s), 5.36 (8H, m).

Reference Example 2

Synthesis of 6-O-dihomo-γ-linolenoyl-ascorbate

Using dihomo-γ-linolenic acid (2.0 g, 6.6 mmol), the same procedure was followed as in Reference Example 1 to give the desired product as a paste (2.43 g, 80% yield).

PMR (d ppm, CDCl$_3$); 0.89 (3H, t), 1.2-1.4 (12H, m), 1.63 (2H, t), 2.0-2.1 (4H, m), 2.39 (2H, t), 2.7-2.9 (4H, m), 4.2-4.3 (3H, m), 4.79 (1H, s), 5.2-5.4 (6H, m).

Reference Example 3

Synthesis of 6-O-docosahexaenoyl-ascorbate

Using docosahexaenoic acid (2.0 g, 6.1 mmol), the same procedure was followed as in Reference Example 1 to give the desired product as a paste (2.5 g, 84% yield).

PMR (d ppm, CDCl$_3$); 0.97 (3H, t), 2.07 (2H, q), 2.43 (4H, q), 2.8-2.9 (10H, m), 4.76 (1H, s), 5.2-5.4 (10H, m), 4.2-4.7 (3H, m), 4.80 (1H, s), 5.2-5.5 (12H, m).

Example 1

Powderization of 6-O-arachidonoyl-ascorbate Using Gum Arabic

Gum Arabic (6.75 g) was dissolved in 45 ml warm water. Meanwhile, 1 part by weight of 6-O-arachidonoyl-ascorbate was uniformly mixed with 4 parts by weight of methyloleate. The mixture (0.675 g) was added to the solution of gum Arabic (San-eigen, manufactured by FFI) and the mixture was vigorously stirred in a homogenizer (polytron PT20SK, manufactured by KINEMATICA) for 1 min to form an emulsion. The average size of the oil droplets present in the resulting emulsion was 0.48 µm (determined by particle size analyzer SALD-2100, manufactured by SHIMADZU CORP.). While gently stirred, the emulsion was atomized by a centrifugal sprayer at 30,000 rpm and was injected into an LB-8 spray drier (manufactured by OOKAWARA) at a rate of 3.0 kg/hr. The temperature at the inlet was 200° C. and the temperature at the outlet was 100 to 110° C. The air flow rate was approximately 7.5 m$^2$/min. The resulting powder. (microcapsule) was collected by a cyclone as the desired product.

Example 2

Powderization of 6-O-arachidonoyl-ascorbate Using Soybean Starch

Using soybean starch (6.75 g) (Soyafibe®, available from FUJIOIL), the same procedure was followed as in Example 1 to obtain the desired powder (microcapsule).

Example 3

Powderization of 6-O-arachidonoyl-ascorbate Using Maltodextrin

Using maltodextrin (6.75 g) (Pinedex #100, manufactured by MATSUTANI KAGAKU), the same procedure was followed as in Example 1 to obtain the desired powder (microcapsule).

Example 4

Test for the Stability Against Oxidation of Arachidonic Acid Moiety of 6-O-arachidonoyl-ascorbate in Microcapsules 240 mg of each powder product (microcapsule) obtained in each example was placed in a flat bottom glass container (1.5 cm inner diameter, 3 cm high). Using an aqueous solution of lithium chloride, the humidity inside the container was maintained at 12% and the powder was stored at 37° C. The cup was taken out at predetermined intervals and the 6-O-arachidonoyl-ascorbate encapsulated in the microcapsules was hydrolyzed, followed by esterification with methyl groups. The amount of non-oxidized arachidonic acid was determined by gas chromatography (GC-14B, manufactured by SHIMADZU CORP.). The samples were analyzed using methyl myristate as an internal standard. The variation of the proportion of the arachidonic acid left unoxidized during the 30-day period was shown in FIG. 1 (with respect to the amount of arachidonic acid on Day 0 (=1.0)).

As a control, gum Arabic, soybean starch (Soyafibe®) and maltodextrin (Pinedex #100) used in the respective examples were used in combination with arachidonic acid to make arachidonic acid powder products (microcapsule), and the powder products were tested in the same manner. Non-powdered arachidonic acid and non-powdered 6-O-arachidonoyl-ascorbate were also tested in the same manner.

The results are collectively shown in FIG. 1.

As can be seen from the results of FIG. 1, as much as 80% of the arachidonic acid of the 6-O-arachidonoyl-ascorbate encapsulated by gum Arabic or soybean starch remained unoxidized after 30 days, whereas only 30% of the non-capsulated 6-O-arachidonoyl-ascorbate remained unoxidized after the same period. This indicates the high stability of microcapsulated 6-O-arachidonoyl-ascorbate against oxidation. In contrast, non-capsulated arachidonic acid disappeared in a few hours.

INDUSTRIAL APPLICABILITY

As set forth, the present invention provides an effective process for making powder products of polyunsaturated fatty acid/ascorbic acid esters, compounds with potential applications in the fields of pharmaceutical products, food products, nutritional products, and cosmetic products. Specifically, the process involves mixing, if necessary, the polyunsaturated fatty acid/ascorbic acid ester with a diluent, mixing the mixture with an aqueous solution of a water-soluble polysaccharide, an excipient, to form an emulsion, and spray-drying the emulsion to obtain a powder product that is easy to handle. Also provided by the present invention are polyunsaturated fatty acid/ascorbic acid ester having improved stability against oxidation and a powder composition comprising such esters.

The powder composition of the present invention comprising a polyunsaturated fatty acid/ascorbic acid ester shows significantly improved stability against oxidation, so that it finds a wide range of applications in the fields of pharmaceutical products, food products, nutritional products, and cosmetic products.

The invention claimed is:

1. A process for making an ascorbic acid ester of a polyunsaturated fatty acid into powder, the ester represented by the following compound of the general formula (I):

(wherein RCO— is an acyl group originating from a polyunsaturated fatty acid; and A is an ascorbic acid residue that is linked via "—O—" originating from the hydroxyl group of ascorbic acid), the process comprising:
  mixing the ascorbic acid ester of polyunsaturated fatty acid with an aqueous solution of a water-soluble polysaccharide excipient to form an emulsion, wherein the mixing ratio by weight of the ester of the general formula (I) to the aqueous solution of the water-soluble polysaccharide excipient is in a range of 1:1 to 1:100; and
  spray-drying the emulsion to dehydrate and dry the emulsion.

2. The process according to claim 1, wherein the ascorbic acid ester of polyunsaturated fatty acid of the compound of the general formula (I) is first mixed with a diluent, and the mixture is then mixed with the aqueous solution of the water-soluble polysaccharide excipient, and wherein the mixing ratio by weight of the mixture of the ester of the general formula (I) and the diluent to the aqueous solution of the water-soluble polysaccharide excipient is in a range of 1:1 to 1:100.

3. The process according to claim 2, wherein the mixing ratio by weight of the compound of the general formula (I) to the diluent is in a range of 1:1 to 1:100.

4. The process according to claim 3, wherein the mixing ratio by weight of the compound of the general formula (I) to the diluent is in a range of 1:3 to 1:10.

5. The process according to claim 1, wherein the mixing ratio by weight of the compound of the general formula (I) or the mixture of the compound of the general formula (I) and the diluent to the aqueous solution of the water-soluble polysaccharide excipient is in a range of 1:1 to 1:100.

6. The process according to claim 5, wherein the mixing ratio by weight of the compound of the general formula (I) or the mixture of the compound of the general formula (I) and the diluent to the aqueous solution of the water-soluble polysaccharide excipient is in a range of 1:2 to 1:20.

7. A process for making an ascorbic acid ester of a polyunsaturated fatty acid into powder, the ester represented by the following compound of the general formula (I):

(wherein RCO— is an acyl group originating from a polyunsaturated fatty acid; and A is an ascorbic acid residue that is linked via "—O—" originating from the hydroxyl group of ascorbic acid), the process comprising:
  mixing the ascorbic acid ester of polyunsaturated fatty acid with an aqueous solution of a water-soluble polysaccharide excipient to form an emulsion, wherein the mixing ratio by weight of the ester of the general formula (I) to the aqueous solution of the water-soluble polysaccharide excipient is in a range of 1:1 to 1:100; and
  spray-drying the emulsion to dehydrate and dry the emulsion, wherein the water-soluble polysaccharide excipient is selected from maltodextrin, gum Arabic, soluble starch, and soybean polysaccharide.

8. The process according to claim 2, wherein the diluent is a long-chain fatty acid or an ester thereof, a surfactant, or a liquid oil.

9. The process according to claim 8, wherein the diluent is selected from methyl oleate, oleic acid, linoleic acid, olive oil, soybean lecithin, a monoglyceride of a fatty acid, and a sugar ester of a fatty acid.

10. The process according to claim 1, wherein A in the compound of the general formula (I) originates from the 6 hydroxyl group of ascorbic acid.

11. A process for making an ascorbic acid ester of a polyunsaturated fatty acid into powder, the ester represented by the following compound of the general formula (I):

$$RCO\text{-}A \quad (I)$$

(wherein RCO— is an acyl group originating from a polyunsaturated fatty acid; and A is an ascorbic acid residue that is linked via "—O—" originating from the hydroxyl group of ascorbic acid), the process comprising:

mixing the ascorbic acid ester of polyunsaturated fatty acid with an aqueous solution of a water-soluble polysaccharide excipient to form an emulsion, wherein the mixing ratio by weight of the ester of the general formula (I) to the aqueous solution of the water-soluble polysaccharide excipient is in a range of 1:1 to 1:100; and spray-drying the emulsion to dehydrate and dry the emulsion, wherein RCO— in the compound of the general formula (I) is selected from acyl groups originating from arachidonic acid, dihomo-γ-linolenic acid, eicosapentaenoic acid and docosahexaenoic acid.

12. A composition containing the powdered compound represented by the general formula (I) and produced by the process according to claim 1.

* * * * *